(12) United States Patent
Traser et al.

(10) Patent No.: US 10,407,809 B2
(45) Date of Patent: Sep. 10, 2019

(54) THERMALLY FUSIBLE SHEETLIKE STRUCTURE AND METHOD FOR PRODUCTION THEREOF

(71) Applicant: Carl Freudenberg KG, Weinheim (DE)

(72) Inventors: Steffen Traser, Darmstadt (DE); Steffen Kremser, Heddesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 187 days.

(21) Appl. No.: 15/305,360

(22) PCT Filed: Mar. 20, 2015

(86) PCT No.: PCT/EP2015/055880
§ 371 (c)(1),
(2) Date: Oct. 20, 2016

(87) PCT Pub. No.: WO2015/161964
PCT Pub. Date: Oct. 29, 2015

(65) Prior Publication Data
US 2017/0044698 A1 Feb. 16, 2017

(30) Foreign Application Priority Data
Apr. 24, 2014 (DE) .................. 10 2014 005 819

(51) Int. Cl.
| | | |
|---|---|---|
| *D04H 1/54* | (2012.01) | |
| *A41D 27/06* | (2006.01) | |
| *A41B 3/06* | (2006.01) | |
| *A41B 7/08* | (2006.01) | |
| *C09J 123/12* | (2006.01) | |
| *D04H 13/00* | (2006.01) | |
| *C09J 7/35* | (2018.01) | |
| *C09J 7/21* | (2018.01) | |

(52) U.S. Cl.
CPC .................. *D04H 1/54* (2013.01); *A41B 3/06* (2013.01); *A41B 7/08* (2013.01); *A41D 27/06* (2013.01); *C09J 7/21* (2018.01); *C09J 7/35* (2018.01); *C09J 123/12* (2013.01); *D04H 13/001* (2013.01)

(58) Field of Classification Search
CPC .......... D04H 1/54; D04H 13/001; A41B 3/06; A41B 7/08; C09J 7/043; C09J 123/12
See application file for complete search history.

(56) References Cited

U.S. PATENT DOCUMENTS

| | | | |
|---|---|---|---|
| 4,326,004 A * | 4/1982 | Hefele | D06M 17/06 |
| | | | 521/139 |
| 5,153,064 A | 10/1992 | Hefele | |
| 6,777,065 B2 | 8/2004 | Grynaeus et al. | |
| 8,603,926 B2 | 12/2013 | Grynaeus et al. | |
| 2006/0198997 A1* | 9/2006 | Goossens | C08K 5/103 |
| | | | 428/304.4 |
| 2008/0311809 A1* | 12/2008 | Grynaeus | A41D 27/02 |
| | | | 442/71 |
| 2010/0086778 A1* | 4/2010 | Fidan | C09J 7/385 |
| | | | 428/343 |
| 2015/0133014 A1* | 5/2015 | Traser | C08G 18/6637 |
| | | | 442/64 |

FOREIGN PATENT DOCUMENTS

| | | |
|---|---|---|
| CN | 1328793 A | 1/2002 |
| CN | 101120136 A | 2/2008 |
| DE | 19532387 A1 | 10/1996 |
| DE | 102005006470 A1 | 8/2006 |
| GB | 1474455 A | 5/1977 |
| JP | 2582486 B2 | 3/1993 |
| WO | WO 2007088115 A1 | 8/2007 |
| WO | WO 2013167250 A1 | 11/2013 |

* cited by examiner

*Primary Examiner* — Jeremy R Pierce
(74) *Attorney, Agent, or Firm* — Leydig, Voit & Mayer, Ltd.

(57) ABSTRACT

A thermally fusible sheetlike structure, especially usable as fusible interlining in the textile industry, has a carrier ply made from a textile material to which has been applied a two-ply adhesive composition structure comprising an underlayer directly adjoining the sheetlike structure and an overlayer disposed upon the underlayer, wherein the underlayer contains a first hotmelt adhesive and the overlayer a second hotmelt adhesive, wherein the first hotmelt adhesive has a melting point of >140° C. and a melt flow index (MFI) value of >50 g/10 minutes (190° C./2.16 kg) and the second hotmelt adhesive a melting point of <145° C. and an MFI value of <50 (190° C./2.16 kg).

20 Claims, No Drawings

THERMALLY FUSIBLE SHEETLIKE STRUCTURE AND METHOD FOR PRODUCTION THEREOF

CROSS-REFERENCE TO RELATED APPLICATIONS

This application is a U.S. national stage application under 35 U.S.C. § 371 of International Application No. PCT/EP2015/055880, filed on Mar. 20, 2015, and claims benefit to German Patent Application No. DE 10 2014 005 819.0, filed on Apr. 24, 2014. The International Application was published in German on Oct. 29, 2015, as WO 2015/161964 A1 under PCT Article 21(2).

FIELD

The invention relates to thermally fusible fabrics, especially usable as fusible interlining or lining material in the textile industry, which are characterized by improved properties in terms of application and by improved processability, and to the production and use thereof as interlining for textiles.

BACKGROUND

Interlining materials are the invisible framework of clothing. They ensure a correct fit and optimal comfort for the wearer. Depending on the application, they facilitate processability, increase functionality and stabilize the clothing. In addition to clothing, they can also undertake these functions in technical textile applications, such as in the furniture, upholstery and home textiles industry.

Important property profiles for interlining materials are softness, resilience, grip, washing and care resistance and sufficient abrasion resistance of the carrier material in use. Furthermore, it is advantageous if the interlining materials have a good and lasting wash resistance, preferably at high temperatures, and withstand demanding post-processing steps such as drying conditions over a high number of cycles and/or the so-called "frost process". The frost process is a dyeing process to create an irregular color pattern and is described, for example, in WO 2007/088115 A1. In this method, the textile products to be dyed are dyed together with granules, which are impregnated with an inertizing liquid. The frost process puts a huge strain on the materials being treated.

Interlining materials can consist of nonwovens, wovens, knitted fabrics or comparable textile fabrics, which are usually additionally provided with an adhesive composition, as a result of which the interlining can be bonded to a face material usually thermally by heat and/or pressure (fusible interlining). The interlining is therefore laminated onto a face material. The various fabrics mentioned each have different property profiles depending on the production method. Wovens consist of threads/yarns in the warp and weft directions; knitted fabrics consist of threads/yarns which are connected to make a textile fabric using a stitch construction. Nonwovens consist of individual threads laid to make a fibrous web, which is bonded mechanically, chemically or thermally.

In the case of mechanically bonded nonwovens, the fibrous web is bonded by the mechanical intertwining of the fibers. For this purpose, either a needling technique or intertwining by means of water or steam jets is used. Needling produces soft products. However, mechanical needling is usually dependent on a mass per unit area of >50 $g/m^2$, which is too heavy for a large number of interlining applications. Nonwovens bonded by water jets, however, can be achieved with lower masses per unit area.

In the case of chemically bonded nonwovens, the fibrous web is provided with a binding agent (for example an acrylate binding agent) by impregnation, spraying or by means of other standard application methods, and is then condensed. The binding agent binds the fibers to one another to form a nonwoven.

Thermally bonded nonwovens are usually bonded by calendering or by hot air for use as interlining materials. In the case of interlining nonwovens, point calender bonding prevails nowadays as the standard technology. In the process, the fibrous web normally consists of fibers made from polyester or polyamide specially developed for this process, and is bonded by means of a calender at temperatures around the melting point of the fibers, a roller of the calender being provided with engraved points. Such engraved points consist, for example, of 64 points/$cm^2$ and can, for example, have a welding surface of 12%. Without a point arrangement, the interlining material would be bonded across the whole surface and would be unsuitably hard to the touch.

The different methods described above for producing textile fabrics are known and are described in specialist books and in patent literature. The adhesive compositions which are usually applied to interlining materials can mostly be thermally activated and normally contain thermoplastic polymers. The technology for applying these adhesive composition coatings takes place according to prior art in a separate work step on the fibrous fabric. Powder dot methods, paste printing methods, double dot methods, scatter methods and hot-melt methods are usually known as adhesive composition technology and are described in patent literature. Nowadays, double dot coating is regarded as the most efficient as regards adhesion to the face material even after care treatment and with respect to the back of the material sticking to the machine.

Such a double dot has a two-layered structure. It consists of a lower dot and an upper dot. The lower dot penetrates the base material and acts as a barrier layer against adhesive composition return and as an anchor for the upper dot particles. Standard lower dots consist, for example, of binding agents and/or a thermoplastic polymer, which contributes to the adhesive strength during fusion. Depending on the chemicals used, the lower dot contributes as a barrier layer to the prevention of adhesive composition return in addition to anchoring in the base material. The principal adhesive component in the two-layered compound is primarily the upper dot. This can consist of a thermoplastic material, which is scattered onto the lower dot as a powder. After the scattering process, the excess part of the powder (between the dots of the lower layer) is suctioned off again expediently. After the subsequent sintering, the upper dot is (thermally) bonded to the lower dot and can act as an adhesive to the upper dot.

Depending on the intended purpose of the interlining material, a different quantity of dots is printed on and/or the adhesive composition quantity or the geometry of the dot pattern is varied. A typical dot count is for example CP 110 at a coating of 9 $g/m^2$ or CP 52 with a coating quantity of 11 $g/m^2$.

Powder coating and paste printing are also widespread. In the case of paste printing, an aqueous dispersion of thermoplastic polymers, usually in particle form with a particle size <80 µm, thickeners and flow promoting agents is produced and then printed as a paste usually in the form of dots onto the carrier ply by means of a rotary screen printing method. Subsequently, the printed carrier ply is subjected expediently to a drying process.

It is known that many different kinds of hot-melt adhesives can be used as adhesive media for heat bonding for interlining and lining materials.

Hot-melt adhesives, also hot glues, or hot melts, have been known for a long time. Generally, they are understood to be essentially solvent-free products, which are applied in a molten state onto an adhesive surface, set quickly when they cool down and therefore rapidly establish strength. Normally, thermoplastic polymers such as polyamides (PA), copolyamides, polyester (PES), copolyester, ethyl vinyl acetate (EVA) and its copolymers (EVAC), polyethylene (PE), polypropylene (PP), amorphous polyalpha olefins (APAO), polyurethanes (PU), etc. are used as hot-melt adhesives.

In principle, the adhesive effect of the hot-melt adhesives is based on them being able to be reversibly fused as thermoplastic polymers, and as liquid melts they are capable, due to their reduced viscosity resulting from the melting process, of wetting the surface to be bonded and as a result forming an adhesion thereto. As a consequence of the subsequent cooling, the hot-melt adhesive sets again to form a solid which has a high cohesion and in this manner generates the connection to the adhesive surface. After the bonding has taken place, the viscoelastic polymers ensure that the adhesion remains intact even after the cooling process with its changes in volume and the associated build-up of mechanical tensions. The cohesion built up transmits the bonding strength between the substrates.

Because of the different molecular structures of the polymers, their physical and chemical properties such as melting point, viscosity and stability against solvents such as detergent suds and chemical cleaning agents differ from one another. These factors play a decisive role in the selection of the polymer for the field of application of the interlining.

For example, for the field of shirt interlining, which must withstand washing conditions up to 95° C., typically high density polyethylene (hereinafter referred to as "HDPE") is used as the hot melt adhesive. This polymer has a high melt range, for example from about 130° C., and a low MFI value (melt index or melt-flow index) of 2-20 g/10 minutes (190° C./2.16 kg load). The disadvantage of this is that, as a result of the high melt range and the high viscosity (corresponding to a low MFI value) of the polymer, fusing temperatures greater than 140° C. are necessary. In the drying processes, for example in the tunnel finisher, blistering and delamination of the bonded layers occur. The high mechanical load resulting from the rapidly circulating hot air and the steam supply are extremely demanding on the applied hot-melt adhesive coating. In addition, very large quantities of the HDPE are required to achieve an adequate adhesive effect.

In particular, for use in highly wash resistant applications that are to be dried in demanding conditions, the hot-melt polymers available on the market nowadays are not sufficiently suitable.

Copolyamides, copolyester and low density polyethylene (LDPE) in the melt range from 100-125° C. with MFI values 2-70 g/10 minutes (140° C./2.16 kg load) do not result in acceptable separating force values after multiple care treatments.

A textile fabric with a coating made from two layers of thermoplastic hot-melt adhesives of different compositions lying one on top of the other is known from DE 10 2005 06 470 A1, the second hot-melt adhesive applied to the first hot-melt adhesive having a melting point >135° C. and a melt flow index (MFI) value of 50 to 250 g/10 minutes (190° C./2.16 kg). In the examples, a polyurethane powder with a melt range of 145-155° C. and a polypropylene with a melting point of 160° C. is described as the scatter powder for the upper dot. A disadvantage of the use of hot-melt adhesives with such a high melting point as the upper dot is that the presses used for fusing need to be heated to a very high temperature. For example, a hot-melt adhesive with a melting point of 145° C. is fused at above 165° C. This means that the use of conventional fusing presses, which are designed for fusing temperatures in the range of 120-140° C., is only possible with difficulty. Added to this is that many face materials are too sensitive to be able to be coated at such high fusing temperatures.

SUMMARY

An aspect of the invention provides a thermally fusible fabric, comprising: a carrier ply comprising a textile material to which has been applied a two-ply adhesive composition structure comprising an underlayer directly adjoining the fabric and an overlayer disposed upon the underlayer, wherein the underlayer comprises a first hot-melt adhesive, wherein the overlayer comprises a second hot-melt adhesive, wherein the first hot-melt adhesive has a melting point of >140° C. and a melt flow index (MFI) value of >50 g/10 minutes (190° C./2.16 kg), and wherein the second hot-melt adhesive has a melting point of <145° C. and an MFI value of <50 (190° C./2.16 kg).

DETAILED DESCRIPTION

Proceeding from this Background, an aspect of the present invention is to provide textile fabrics equipped with hot-melt adhesives which can easily be processed using standard fusing presses at temperatures below 165° C. and which have a very good and lasting wash resistance at 95° C. and which withstand extreme post processing steps such as drying conditions at high cycle rates and/or the "frost process".

An aspect is achieved according to the invention by a thermally fusible fabric, especially usable as fusible interlining in the textile industry, having a carrier ply made from a textile material to which has been applied a two-ply adhesive composition structure comprising an underlayer directly adjoining the fabric and an overlayer disposed upon the underlayer, the underlayer containing a first hot-melt adhesive and the overlayer a second hot-melt adhesive, the first hot-melt adhesive having a melting point of >140° C. and a melt flow index (MFI) value of >50 g/10 minutes (190° C./2.16 kg) and the second hot-melt adhesive having a melting point of <145° C. and an MFI value of <50/10 minutes (190° C./2.16 kg).

The fabric according to an aspect of the invention is characterized by a special two-ply adhesive composition structure in which a relatively low-melting and highly viscous overlayer is combined with a high-melting-point and low viscosity underlayer.

Due to the low melting point of the overlayer, the fusion can be carried out at comparatively low temperatures, for example below 165° C., preferably from 140° C. to 160° C., which allows the use of temperature-sensitive face materials. It is also advantageous that the setting of lower fusing temperatures saves costs and resources and, moreover, conventional fusing presses can be used. According to a preferred embodiment of the invention, the second hot-melt adhesive used to form the overlayer has a melting point of 90° C. to 145° C., more preferably from 110° C. to 145° C. and in particular from 120° C. to 140° C.

According to a further preferred embodiment of the invention, the second hot-melt adhesive used to form the overlayer has an MFI value of 2 to 50 g/10 minutes (190° C./2.16 kg), more preferably of 2 to 45 g/10 minutes (190° C./2.16 kg) and in particular of 3 to 40 g/10 minutes (190° C./2.16 kg).

Practical tests have shown that particularly good results are achieved when the second hot-melt adhesive used to form the overlayer has a melting point of 110° C. to 145° C. in combination with an MFI value of 2 to 45 g/10 minutes (190° C./2.16 kg).

In addition, it was found surprisingly that the fabric according to the invention is characterized by a high separation force, measured according to DIN 54 310, of preferably 5 N/5 cm to 50 N/5 cm, more preferably of 10 N/5 cm to 40 N/5 cm, and in particular of 10 N/5 cm to 30 N/5 cm, which can also be maintained after demanding post processing steps such as dyeing with the frost method or when used as rental textiles. Without committing to one mechanism according to the invention, it is presumed that the high separation force comes about as a result of the special balancing of the melting points and MFI values of the hot-melt adhesives of the overlayer and underlayer, which leads to a good bonding of the overlayer and underlayer.

In the case of the preferred embodiment of the adhesive composition structure according to the invention as a double dot adhesive composition structure, the lower dots can contribute to the bonding due to their comparatively high MFI values in that they flow around the upper dots at the edges.

Furthermore, it is advantageous that the fabric according to the invention advantageously withstands at least 25, preferably at least 50 cycles of the test conditions according to ISO 15797:2004 "Industrial washing and finishing procedures for testing of workwear" and/or washing treatments up to 95° C., and do not demonstrate any "color pick up" during use.

Additionally, the low MFI value of the overlayer offers the advantage that a hot-melt adhesive penetration through the face material and sticking of the back to the machine during sandwich fusing between the layers can be prevented.

According to a preferred embodiment of the invention, the adhesive composition structure is formed as a double dot coating.

Adhesives that are preferably on a polyolefin basis with the ranges of melting points and melting indexes (MFI values) defined above are used as the hot-melt adhesive for the overlayer and/or underlayer. The melting index within the scope of this description should be taken to mean the MFI value determined according to DIN 53735: 1980-10 or ISO 1133.

In addition to homopolymers derived from alpha olefins, preferably from propylene or ethylene, the term polyolefin also covers copolymers, which, in addition to structural units derived from alpha olefins, contain structural units derived from other ethylenically unsaturated hydrocarbons, for example from other alpha olefins and/or from vinyl aromatics such as styrene.

Examples of alpha olefins are ethylene, prop-1-ene, but-1-ene, pent-1-ene, hex-1-ene, oct-1-ene or dec-1-ene.

All known polyolefin types per se can be used. Examples of these are polyolefins, which have been produced by the Ziegler-Natta method or using metallocene catalysts.

Examples of polyolefins preferably used are polyethylenes, polypropylenes or copolymers derived from ethylene and propylene. Further examples are copolymers derived from ethylene or from propylene with further alpha olefins with a higher carbon number such as but-1-ene, pent-1-ene, hex-1-ene, oct-1-ene or dec-1-ene.

One or both layers of the hot-melt adhesive can also contain a modified polyolefin in addition to the respective polyolefin (mixture). This should be taken to mean a copolymer which is derived from at least one alpha olefin, and from an ethylenically unsaturated acid or its anhydride or from an ethylenically unsaturated epoxy compound or from a mixture of two or more of these comonomers. In the process, the modification can be carried out in any chosen manner, for example as copolymerization of alpha-olefin monomer(s) together with selected comonomer(s) and/or as a grafting of selected polar comonomer(s) onto a polyolefin.

Examples of alpha olefins or other olefinically unsaturated hydrocarbons which have been used to produce this group of copolymers individually or in combinations with one another have already been listed above in the description of the production of the homopolymers or copolymers derived from one or more alpha olefins.

Preferably, polypropylenes or in particular polyethylenes or copolymers derived from ethylene and acrylic acid esters and/or methacrylic acid esters, in particular alkyl esters, are used in the group of modified polyolefins.

According to a preferred embodiment of the invention, the overlayer contains ethylene, prop-1-ene, but-1-ene, pent-1-ene, hex-1-ene, oct-1-ene, dec-1-ene or mixtures or copolymers thereof with a melting point of 110° C. to 145° C. and an MFI of 2 to 45 g/10 minutes (190° C./2.16 kg) as the principal components, i.e. in a quantity of at least 50 wt. %, for example of 50-100 wt. % or of 60-100 wt. % or of 70-100 wt. % or of 80-100 wt. % or of 90-100 wt. % or of 100 wt. %.

It is also feasible for the overlayer and/or the underlayer to contain further thermoplastic polymers alternatively or additionally to the polyolefin. The thermoplastic polymers differing from the polyolefin can, for example, comprise (co)-polyester based, (co)-polyamide based, ethyl vinyl acetate based, and/or polyurethane based polymers and/or combinations (mixtures and copolymerizates) of the polymers mentioned and be present in a coating weight of 0.1 to 30 g/m$^2$.

According to a preferred embodiment of the invention, the overlayer contains the hot-melt adhesive in a quantity of 0.1 to 30 g/m$^2$, preferably of 2 to 25 g/m$^2$. The underlayer contains the hot-melt adhesive preferably in a quantity of 0.1 to 20 g/m$^2$, more preferably of 2 to 15 g/m$^2$ and in particular, from 5 to 15 g/m$^2$. According to a particularly preferable embodiment of the invention, both the overlayer and the underlayer contain the hot-melt adhesive in a quantity of preferably 2 to 15 g/m$^2$.

The hot-melt adhesives used according to the invention can also contain further additives that are standard per se. These are added depending on the desired property profile and application and processing method of the hot-melt adhesive. Examples of such additives are emulsifiers, thickeners, pigments and processing aids.

As described above, polypropylene, preferably in a quantity of at least 0.1 to 30 g/m$^2$, preferably of 2 to 15 g/m$^2$, based on the total quantity of the overlayer, with a melting point of 125° C. to 145° C., are particularly suitable for forming the overlayer. According to the invention, the second hot-melt adhesive particularly preferably consists of polyolefins. Polyurethanes, polyester and/or polyamide have also proven to be suitable as principal components.

Furthermore, it is feasible for the polyolefin in the overlayer to be mixed with conventional thermoplastics, for example. Polyamide (PA), polyester (PES), ethylene vinyl acetate, polyurethane and their copolymers, etc. have proven to be particularly suitable. The polyolefin can also be extruded together with the other thermoplastics (compound).

Very good results were also achieved with the use of polyolefin, which, when mixed, has a polyolefin copolymer, preferably with a melting point of 90° C. to 145° C. and an MFI of 10 to 160 g/10 minutes (190° C./2.16 kg), preferably of 20 to 80 g/10 minutes (190° C./2.16 kg) in a quantity of 2-98 wt. %, preferably 2-50 wt. %, based on the total quantity of polyolefin in the overlayer.

According to a preferred embodiment of the invention, the polyolefin used for forming the overlayer in a mixture with the polyolefin copolymer has a melting point of 110° C. to 145° C., preferably of 120° C. to 140° C. and an MFI value of 3 to 45 g/10 minutes, preferably of 5 to 35 g/10 minutes (190° C./2.16 kg).

According to a further preferred embodiment of the invention, the difference between the melting points of the first and of the second hot-melt adhesive is from 5 to 50° C., more preferably from 5 to 20° C. and in particular from 5 to 10° C. and/or the difference between the MFI of the first and of the second hot-melt adhesive is from 5 to 150 g/10 minutes (190° C./2.16 kg), more preferably from 20 to 120 g/10 minutes (190° C./2.16 kg).

The first hot-melt adhesive used to form the underlayer preferably has a melting point of 140° C. to 200° C., more preferably from 150° C. to 170° C. and/or an MFI in the range from 51 g/10 minutes (190° C./2.16 kg) to 160 g/10 minutes (190° C./2.16 kg), more preferably from 80 g/10 minutes (190° C./2.16 kg) to 130 g/10 minutes (190° C./2.16 kg).

As described above, polyolefins, and polypropylene in particular, preferably in a quantity of 0.1 to 20 g/m², preferably of 2 to 15 g/m², are also particularly suitable for forming the underlayer. Particularly preferably, according to the invention, the first hot-melt adhesive consists of polyolefins. Polyurethanes, polyester and/or polyamide, optionally in combination with polyolefins, have likewise proven to be suitable.

The underlayer thus preferably contains thermoplastic polymers, which can contribute to bonding during fusion. By using polyolefins in the underlayer, very good bonding of the overlayer is achieved and the separating force can increase and the trickling of powder can reduce. Greatly improved anchoring to the upper dot is an advantage over, for example, polyamides. Additionally, the adhesive force to coated face materials is promoted.

A wide variety of combinations are also possible for the lower dot. For example, combinations of polyolefins with conventional thermoplastics (PA/PES/polyolefins, ethylene vinyl acetate, copolymers, etc.) and with conventional binding agents (acrylate dispersions, silicon dispersions, etc.) can be used.

In a preferred embodiment, the underlayer contains 50 to 100 wt. % polypropylene, preferably 60 to 90 wt. % polypropylene and in particular 70 to 80 wt. %. The overlayer lying on top of the underlayer preferably contains a polypropylene which has a lower melt flow than the polymer used in the underlayer.

In addition to the first hot-melt adhesive, the underlayer can also contain a binding agent. Here, the binding agent can be a physically cross-linking binding agent and/or a chemically cross-linking binding agent. The binding agent is preferably a binding agent of the acrylate type, styrene acrylate type, ethylene vinyl acetate type, butadiene acrylate type, SBR type, NBR type and/or polyurethane type or a mixture of the substances mentioned above. The binding agent is preferably contained in the underlayer in a quantity of from 5 wt. % to 70 wt. %.

If the binding agent is a polyurethane, in this case a polyurethane binding agent is understood to be a polymer with a melting point >190° C. which does not contribute to the adhesive force during bonding. Such two-ply adhesive compositions are characterized by a low adhesive composition return, since the layer first applied and containing a binding agent acts as a barrier layer. If a thermoplastic polymer with a melting point <190° C. is added to the underlayer, this contributes to the bonding in addition to the overlayer.

Polyester polyurethanes, preferably aliphatic polyester polyurethanes, are to be preferred for the binding agent, since they have an excellent film formation property and enter into a good physical interaction with one another (forming a film). As a result of chemical cross-linking, the resistance against the back sticking to the machine can be increased further. This is then advantageous when flexibility and elasticity are less relevant. The advantages over, for example, acrylate dispersions are the greater flexibility and elasticity, a lower residual elongation, lower cross-linking temperatures and the better bonding to the overlayer.

An underlayer containing a binding agent is preferably produced by means of an aqueous lower dot dispersion. Furthermore, in such a dispersion, additives can also be contained, which among other things contribute to the adjustment of viscosity and to the flow behavior of the paste. The haptics of the interlining material can vary to a large extent as a result of a suitable binding agent composition.

The underlayer preferably contains the hot-melt adhesive in a quantity of 0.1 to 20 g/m². According to a particularly preferred embodiment of the invention, both the overlayer and the underlayer contain polyolefin in a quantity of preferably 2 to 15 g/m².

The ratio of the masses of the first and of the second hot-melt adhesive can vary depending on the polymers used and the intended application. Good results are achieved in many cases when the ratio of the masses of the first and of the second hot-melt adhesive is in the range of 5:1 to 1:5, preferably of 2:1 to 1:3.

For the field of interlining, it is advantageous if the hot-melt adhesive is produced as a granulate, which can be easily ground.

Here, the size of the powder particles obtained when the granulate is ground is advantageously orientated to the surface to be printed, for example the desired size of a bonding dot. The particle diameter can vary between >0 μm and 500 μm in a dot pattern. Generally, the particle size of the thermoplastic powder is not uniform, but rather there is a distribution, i.e. there is always a range of particle sizes. The particle size is advantageously adjusted to the desired application amount, dot size and dot distribution.

Practical tests have shown that the powder particles used to produce the overlayer expediently have particle sizes in the range of >0 to 400 μm, preferably of >0 to 300 μm. According to the invention, particularly preferred are powder particles particularly preferred with a particle size distribution in which the proportion of the fraction in the range from 0 to 80 μm is from 0 to 20 wt. %, preferably from 5 to 15 wt. %, the proportion of the fraction in the range from 80 to 125 μm is from 5 to 30 wt. %, preferably from 10 to 25 wt. %, the proportion of the fraction in the range from 125 to 160 μm is from 5 to 35 wt. %, preferably from 10 to 25 wt. %, the proportion of the fraction in the range from 160 to 200 µm is from 5 to 40 wt. %, preferably from 10 to 25 wt. % and/or, preferably and, the proportion of the fraction in the range of over 200 µm is from 20 to 70 wt. %, preferably from 30 to 60 wt. %.

The aforementioned particle size distribution is characterized in that it has proportions both in the range of the small and the large particle size fractions. It is presumed that the advantageous properties of powder particles with the aforementioned particle size distribution are brought about in that the fractions with smaller particle sizes can form a particularly even layer on the lower dot, which leads to a particularly good anchoring on the lower dot. The fractions with larger particle sizes can be deposited on this layer. The localization of these rather larger particles on the surface has the advantage that they are better suited to bonding with the face material than smaller particles. This is at least partly due to the fact that larger particles provide more mass for bonding with the face material than smaller particles. Against this background, it is particularly preferable to use powder particles with a particle size distribution in which the proportion of the fraction in the range from 0 to 80 µm is from 0 to 20 wt. %, preferably from 5 to 15 wt. % and the proportion of the fraction in the range from 160 to 200 µm is from 5 to 40 wt. %, preferably from 10 to 25 wt. % and the proportion of the fraction in the range from over 200 µm is from 20 to 70 wt. %, preferably from 30 to 60 wt. %.

The determination of the proportions of the fractions can be measured in a conventional manner, for example by means of air jet sieving, according to DIN EN ISO 4610, October 1997.

The ground powder particles should have as round a geometry as possible in order to ensure error-free scattering and error-free incorporation and sintering.

According to the invention, the hot-melt adhesives can also be used with other conventional coating methods in the field of interlining such as powder dot methods, paste printing methods, double dot methods, scatter methods, hot melt methods, scatter coating, etc. For this purpose, other particle size distributions or, for example, a paste formulation are expediently used.

It is also feasible that no clear phase boundary can be detected between the hot-melt adhesive overlayer and the hot-melt adhesive/binding agent underlayer. This can, for example, be caused by the thermoplastic polymer being applied in particle form in a mixture with a binding agent, for example in the form of a dispersion, and possibly further components. After application, the binding agent is separated from the coarser particles, the coarser particles coming to rest more on the upper surface of the binding surface, for example on the dot surface. The binding agent binds the coarser particles in addition to its function of anchoring itself in the carrier ply and additionally binding said ply. A partial separation of particles and binding agent occurs simultaneously on the surface of the carrier ply. The binding agent penetrates deeper into the material, while the particles accumulate on the surface. As a result of this, although the coarser polymer particles are incorporated into the binding agent matrix, their free (upper) surface on the surface of the nonwoven is simultaneously available for direct bonding to the face material. A double-dot-like structure forms, only one single process step being necessary to produce this structure in contrast to the known double dot method, and also the complex suctioning off of excess powder is omitted.

According to a particularly preferred embodiment of the invention, the two-ply adhesive composition structure is in the form of a double dot structure. Here, the double dot is preferably applied to the carrier ply on the basis of a, preferably aqueous, dispersion as the lower dot and a scatter powder as the upper dot in a dot pattern. The dot pattern can be distributed regularly or irregularly. The printing is, however, in no way limited to dot patterns. The adhesive composition structure can be applied in any chosen geometry, for example also in the form of lines, stripes, mesh-like or latticed structures, dots with rectangular, rhomboid or oval geometry or similar.

In a further preferred embodiment, the underlayer applied to the fabric is applied to the fabric as a preferably aqueous dispersion in the form of an irregular dotted grid. The overlayer lying on top of this can consist of a powder or a powder mixture, which has been applied to the fabric. In the places where the dispersion is located, the powder (mixture) is retained, while it can easily be removed from the surface of the fabric in the other places.

The textile material to be used for the carrier ply is selected with regard to the particular intended application and the specific quality requirements. For example, wovens, knitted materials, meshes, lattices and/or nonwovens are suitable. No limits are set here in principle by the invention. The person skilled in the art can easily find the material combination suitable for their application. Preferably, the carrier ply consists of a nonwoven.

The textile carrier plies modified by adhesives according to the invention can be produced using any fabric forming technique. Examples of this are weaving, laying, knitting or wet or dry nonwoven production methods.

Nonwovens, but also the threads or yarns of the textile materials, can consist of synthetic fibers but also of natural fibers. Polyester fibers, polyamide fibers, regenerated cellulose fibers and/or binding fibers are preferably used as synthetic fibers and wool or cotton fibers as natural fibers.

Here, the synthetic fibers can comprise crimpable, crimped and/or uncrimped staple fibers, crimpable, crimped and/or uncrimped, directly spun continuous fibers and/or discontinuous fibers such as melt blown fibers. The carrier ply can have a single or multiple layered structure.

The technologies described at the outset can be used for the production of the nonwoven. The binding of the fibers of the fibrous web to make a nonwoven can be carried out mechanically (conventional needling, water jet technology), by means of a binding agent or thermally. In the process, however, a moderate strength of nonwoven of the carrier ply before printing is adequate since the carrier ply additionally has binding agent applied thereto and is strengthened during printing with the mixture of the binding agent and thermoplastic polymer. For moderate nonwoven strengths, cost effective fiber raw materials can also be used, provided these meet the requirements for handling. Process control can also be simplified.

In the case of the use of staple fibers, it is advantageous to card them with at least one carding machine to form a fibrous web. Random laying (random technology) is preferable here, but combinations of lengthways or crossways or more complicated carding arrangements are also possible if special nonwoven properties are to be allowed and when multi-ply fiber structures are desired.

Fibers with a titer of up to 6.7 dtex are particularly suitable for interlining materials. Coarse titers are not normally used due to the high stiffness of their fibers. Fiber titers in the range from 1 to 2 dtex are preferable, but microfibers with a titer <1 dtex are also feasible.

According to the invention, textile fabrics can be strengthened per se in a known manner, for example by mechanical or hydrodynamic needling, by the melting of the binding fibers present in textile fabrics, by thermal-mechanical strengthening and/or by the application of binding agents.

Typically, the textile fabrics according to the invention, in particular the nonwovens, have masses per unit area, measured according to DIN EN 29073, of 6 to 500 g/m$^2$.

Most preferably, textile fabrics with masses per unit area of 30 to 200 g/m$^2$ are used.

After the production of the textile fabric, it can preferably be provided with two layers of different hot-melt adhesives in a manner known per se, preferably according to the "double dot method".

The invention also relates to a method for producing the textile fabric described above. The method comprises the steps of:
a) producing a textile fabric by a textile sheet-forming technique,
b) applying a layer of a first hot-melt adhesive to the textile fabric and
c) applying a layer of a second hot-melt adhesive to the textile fabric such that a
d) layer of the second hot-melt adhesive forms over the layer of the first hot-melt adhesive.

In the process, the first and second hot-melt adhesives are used according to the above definitions.

According to a preferred embodiment of the invention, the hot-melt adhesive layers are applied in the form of double dots.

The hot-melt adhesives used according to the invention can be produced in various different ways known per se.

Examples of this are the grinding of the components with subsequent powder mixing, the mixture of the components in granular form with subsequent grinding and the mixture of the components by means of extrusion followed by subsequent grinding.

The hot-melt adhesives can likewise be applied according to different methods known per se.

For example, in a first step, a paste of the first hot-melt adhesive can be applied to the textile fabric in the form of a regular or preferably irregular pattern. In the process, it can be applied by screen printing or by application by a textured roller. In a second step, a powder made from the second hot-melt adhesive can then be scattered onto the textile fabric, which sticks to the paste in the places of the first hot-melt adhesive. The powder can be removed from the other places on the surface of the textile fabric by suction. In a subsequent thermal treatment, the first and second hot-melt adhesives are fused as layers lying one on top of the other.

According to a particularly preferred embodiment of the invention, the overlayer and underlayer are advantageously applied in the form of conventional double dot coating. In order to form the lower dot, hot-melt adhesive dispersions containing binding agents can be used. Furthermore, by using binding agents, the bonding to the upper dot can be greatly improved and therefore the separating force of the adhesive composition system can be increased. A lower dot containing a binding agent offers the advantage that it can be physically or chemically cross-linked and the sticking of the back of the material to the machine can therefore be greatly reduced.

According to a preferred embodiment, the first hot-melt adhesive is applied in the form of an aqueous hot-melt adhesive dispersion. Furthermore, additives, which contribute among other things to the adjustment of the viscosity and to the flow behavior of the paste, can also be contained in the aqueous lower dot dispersions. The haptics of the interlining material can be varied to a great extent by using a suitable binding agent composition.

The solids content of the hot-melt adhesive dispersion can be between 10% and 70%, preferably between 15% and 60% and particularly preferably between 20% and 60%, in particular between 30% and 50%.

According to a preferred embodiment of the invention, the hot-melt adhesive dispersion at 20° C. has a viscosity of at least 10,000 mPas, preferably from 20,000 mPas to 60,000 mPas, more preferably from 35,000 mPas to 50,000 mPas. An advantage with the use of a rather more highly viscous hot-melt adhesive dispersion is that raised lower dots can be formed thereby, which have a particularly large surface area to accommodate the hot-melt adhesive for the lower dots.

The hot-melt adhesive dispersion can be stabilized by internal and/or external anionic, cationic or neutral emulsifiers.

The pH value of the hot-melt adhesive dispersion is preferably in the range from 4.0 to 11.0, more preferably between 5.0 and 10.0, more preferably between 6 and 9.

The modified textile fabrics according to the invention can be used as interlining or lining materials. The invention also relates to the use for these purposes, in particular as reinforcing interlining and/or as heavy duty lining in care treatments and/or for rental textiles.

In particular, the textile fabrics according to the invention are suitable for use as reinforcing interlining or stiffening interlining for collars and cuffs of work clothing, in particular for rental textiles.

The modified textile fabrics according to the invention can be bonded to a textile face material to be stiffened in a manner known per se.

According to the invention, a wide variety of face materials can be used, for example PES, cotton or batiste face materials.

The use of a thermally fusible fabric according to the invention is, however, not limited to this application. Other applications are also feasible, for example as fusible textile fabrics for home textiles such as upholstered furniture, reinforced seat structures, seat covers or as fusible and ductile textile fabrics for automotive accessories, shoe components or in the hygiene/medical field.

The invention is described hereinafter with reference to two examples, without being limited thereto:

Example 1

A nonwoven base material made from 100% polyester with a mass per unit area of 36 g/m$^2$ was coated according to the double dot method. In the process, a paste was used for the lower dot which, in addition to the conventional additives such as emulsifiers, thickeners and processing aids, also contained a thermoplastic polyolefin (polypropylene) with an MFI value >50 g/10 minutes at 190° C. and 2.16 kg load and a melting point of 160° C. A thermoplastic polyolefin (polypropylene) with an MFI value <50 g/10 minutes at 190° C. and 2.16 kg load and a melting point of 136° C. was used as the scatter powder for the upper dot. In the coating process, 5 g/m$^2$ of lower dot paste and 10 g/m$^2$ of scatter powder were applied. The fusing of the interlining to a woolen face material and a cotton face material was subsequently performed at 165° C. (fusing temperature 140° C.) for 20 sec. and at 3 bar.

For comparison, the interlining produced according to example 2 in DE 10 2005 06 470 A1 was fused at 165° C. and not as specified at 180° C. (fusing temperature 160° C.).

Both interlining samples were subjected to the so-called frost process (see WO 2007/088115).

The separating force values on wool and cotton before and after the frost process are shown in Table 1.

TABLE 1

| Material | Face material | Separating force before frost process [N/5 cm] | Separating force after frost process [N/5 cm] |
|---|---|---|---|
| Adhesive composition system according to the invention | Wool | 15.8 | 16.8 |
| Adhesive composition system according to the invention | Cotton | 7.1 | 11.7 |
| Adhesive composition system according to Example 2 in DE 10 2005 06 470 A1 | Wool | 0 | 0 |
| Adhesive composition system according to Example 2 in DE 10 2005 06 470 A1 | Cotton | 0 | 0 |

It can be seen that the interlining according to the invention demonstrates very good separating force values even after the frost process. In contrast, no fusing of the face material can be achieved with the adhesive composition system from prior art using the selected fusing conditions.

Example 2

A nonwoven base material made from 100% cotton with a mass per unit area of 130 g/m² was coated according to the double dot method. In the process, a paste was used for the lower dot which, in addition to the conventional additives such as emulsifiers, thickeners and processing aids, also contained a thermoplastic polyolefin (polypropylene) with an MFI value >50 g/10 minutes at 190° C. and 2.16 kg load and a melting point of 160° C. A thermoplastic polyolefin (polypropylene) with an MFI value <50 g/10 minutes at 190° C. and 2.16 kg load and a melting point of 136° C. was used as the scatter powder for the upper dot. In the coating process, 12 g/m² of lower dot paste and 20 g/m² of scatter powder were applied. The fusing of the interlining to a TOPAS face material (50% cotton and 50% polyester) and a shirt poplin face material (50% cotton and 50% polyester) was subsequently performed at 160° C. for 26 sec. and at 1 bar. Fusing to these face materials is carried out at at least 180° C. using adhesive composition systems that are standard on the market. Subsequently, the composite with the TOPAS face material was washed for 10× cycles with a strongly alkaline washing agent for industrial washing applications at 90° C. and dried each time at 155° C. for 8 min in an oven. The composite with the shirt poplin face material was subjected to 25 cycles of industrial washing with drying in a tunnel finisher.

The separating force values before and after the relevant washing are shown in Table 2.

TABLE 2

| Material | Facing material | Separating force before 10 × 90° C. [N/5 cm] | Separating force after 10 × 90° C. [N/5 cm] | Separating force before rental textile process [N/5 cm] | Separating force after rental textile process [N/5 cm] |
|---|---|---|---|---|---|
| Adhesive composition system according to the invention | TOPAS | 13 | 24.1 | | |
| Adhesive composition system according to the invention | Shirt poplin | | | 12.2 | 10.0 |

It was possible to show that nonwoven interlining materials coated with the adhesive composition system according to the invention are characterized by a high wash resistance even in industrial washing processes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A thermally fusible fabric, comprising:
   a carrier ply comprising a textile material to which has been applied a two-ply adhesive composition structure comprising an underlayer directly adjoining the fabric and an overlayer disposed upon the underlayer,
   wherein the underlayer comprises a first hot-melt adhesive,
   wherein the overlayer comprises a second hot-melt adhesive, wherein the first hot-melt adhesive has a melting point of >140° C. and a melt flow index (MFI) value of >50 g/10 minutes (190° C./2.16 kg), and wherein the second hot-melt adhesive has a melting point of <145° C. and an MFI value of <50 (190° C./2.16 kg).

2. The fabric of claim 1, wherein the second hot-melt adhesive in the overlayer has a melting point of 90° C. to <145° C. and an MFI value of 2 to 50 g/10 minutes (190° C./2.16 kg).

3. The fabric of claim 1, wherein the second hot-melt adhesive comprises a polyolefin, polyurethane, polyester, ethylene vinyl acetate, polyamide, or a mixture of two or more of any of these, in a quantity from 0.1 to 30 g/m².

4. The fabric of claim 3, wherein the second hot-melt adhesive comprises a polyolefin in a quantity of 0.1 to 30 g/m².

5. The fabric of claim 4, wherein the second hot-melt adhesive comprises a polyolefin copolymer and has a melting point from 90° C. to <145° C. and an MFI of 2 to 45 g/10 minutes (190° C./2.16 kg), based on the total quantity of polyolefin in the overlayer.

6. The fabric of claim 1, wherein the first hot-melt adhesive has a melting point of >140° C. to 200° C.

7. The fabric of claim 1, wherein the first hot-melt adhesive has an MFI in the range from 51 g/10 minutes (190° C./2.16 kg) to 160 g/10 minutes (190° C./2.16 kg).

8. The fabric of claim 1, wherein the first hot-melt adhesive comprises a polyolefin, polyamide, polyurethanes, ethylene vinyl acetate and/or polyester.

9. The fabric of claim 1, wherein the first hot-melt adhesive comprises a polypropylene in a quantity of 50 to 100 wt. %.

10. The fabric of claim 1, wherein a mass ratio of the first and second hot-melt adhesives is in a range of from 5:1 to 1:5.

11. The fabric of claim 1, wherein powder particles are used to produce the overlayer, the particles having a particle size distribution in which a proportion in a range from 0 to 80 µm is from 0 to 20 wt. %, a proportion in a range from 160 to 200 µm is from 5 to 40 wt. %, and a proportion in a range of over 200 µm is from 20 to 70 wt. %.

12. The fabric of claim 1, in the form of a fusible interlining suitable for textile industry use.

13. The fabric of claim 3, wherein the second hot-melt adhesive comprises polypropylene in a quantity of 0.1 to 30 g/m².

14. An interlining and/or as lining for production of a rental textile, comprising the fabric of claim 1.

15. A method for producing the fabric of claim 1, the method comprising:
   a) producing the textile fabric by a textile sheetlike forming method;
   b) applying a layer of the first hot-melt adhesive to the textile fabric; and
   c) applying a layer of the second hot-melt adhesive to the textile fabric, so as to form a layer of the second hot-melt adhesive over the layer of a first hot-melt adhesive.

16. The method of claim 15, wherein the applying b) comprises applying, a dispersion of the first hot-melt adhesive to the textile fabric in the form of a pattern, and wherein the applying c) comprises scattering a powder of a second hot-melt adhesive onto the textile fabric, which sticks to the dispersion in places of the first hot-melt adhesive, removing the powder from remaining places on the surface of the textile fabric by suction, and subsequently thermally treating the first and second hot-melt adhesives so as to fuse layers lying one on top of the other.

17. The method of claim 16, wherein the dispersion of the first hot-melt adhesive has a viscosity at 20° C. of at least 10,000 mPas.

18. The method of claim 15, further comprising:
   dyeing the fabric coated in the hot-melt adhesives, so as to form an irregular color pattern.

19. The method of claim 16, wherein the dispersion is aqueous
   and/or
   wherein the pattern is at least partially irregular.

20. A method of reinforcing or stiffening an interlining for a collar or cuff of work clothing, the method comprising:
   including the fabric of claim 1 into the collar or cuff.

* * * * *